US010691932B2

(12) United States Patent
Lee (10) Patent No.: US 10,691,932 B2
(45) Date of Patent: Jun. 23, 2020

(54) SYSTEMS AND METHODS FOR GENERATING AND ANALYZING USER BEHAVIOR METRICS DURING MAKEUP CONSULTATION SESSIONS (71) Applicant: Perfect Corp., New Taipei (TW)

(72) Inventor: Wan-Chuan Lee, Changhua County (TW)

(73) Assignee: PERFECT CORP., New Taipei (TW)

( * ) Notice: Subject to any disclaimer, the term of this patent is extended or adjusted under 35 U.S.C. 154(b) by 271 days.

(21) Appl. No.: 16/008,217

(22) Filed: Jun. 14, 2018

(65) Prior Publication Data

US 2019/0244015 A1 Aug. 8, 2019

Related U.S. Application Data (60) Provisional application No. 62/627,010, filed on Feb. 6, 2018.

(51) Int. Cl.
*G06K 9/00* (2006.01)
*H04N 7/14* (2006.01)
(Continued)

(52) U.S. Cl.
CPC ..... *G06K 9/00335* (2013.01); *G06K 9/00744* (2013.01); *G06Q 30/02* (2013.01);
(Continued)

(58) Field of Classification Search
CPC ........... G06K 9/00335; G06K 9/00744; G06Q 30/02; G06T 11/60; H04L 12/1813; H04N 7/141
See application file for complete search history.

(56) References Cited

U.S. PATENT DOCUMENTS 7,634,103 B2 12/2009 Rubinstenn et al.
8,082,926 B2 12/2011 Yano et al.
(Continued)

FOREIGN PATENT DOCUMENTS

EP 2686835 A1 1/2014
EP 3227012 A1 10/2017
(Continued)

OTHER PUBLICATIONS

Virtual Makeover Magic Mirror, http://sensemi.com/services/virtual-makeover-magic-mirror/ (printed Jun. 7, 2018).
(Continued)

*Primary Examiner* — David F Dunphy
(74) *Attorney, Agent, or Firm* — McClure, Qualey & Rodack, LLP (57) ABSTRACT

A server device detects initiation of a video conferencing session between a consultation device utilized by a makeup professional and a client device utilized by a user receiving a makeup consultation from the makeup professional. The server device extracts data from the client device during the video conferencing session, the data characterizing behavior of the user performed on the client device with respect to suggested cosmetic effects transmitted by the makeup professional via the consultation device to the client device. The server device applies weight values to the extracted data and generates one or more hesitation metrics based on the weight values and causes the one or more hesitation metrics to be displayed in a user interface on the consultation device.

21 Claims, 10 Drawing Sheets (51) Int. Cl.
    *G06T 11/60* (2006.01)
    *G06Q 30/02* (2012.01)
    *H04L 12/18* (2006.01)
(52) U.S. Cl.
    CPC .......... *G06T 11/60* (2013.01); *H04L 12/1813* (2013.01); *H04N 7/141* (2013.01)

(56) References Cited

U.S. PATENT DOCUMENTS

| | | | |
|---|---|---|---|
| 8,908,904 | B2 | 12/2014 | Santos et al. |
| 9,058,765 | B1 | 6/2015 | Mallick et al. |
| 9,449,412 | B1 | 9/2016 | Rogers et al. |
| 9,460,462 | B1 | 10/2016 | Walker et al. |
| 9,674,485 | B1 | 6/2017 | Sugaya |
| 2002/0065456 | A1* | 5/2002 | Bazin ............... A61B 5/448 600/407 |
| 2003/0120534 | A1* | 6/2003 | Giacchetti ............ G06Q 30/02 705/26.7 |
| 2006/0129411 | A1* | 6/2006 | Bhatti ............... G06Q 30/02 705/346 |
| 2012/0158184 | A1 | 6/2012 | Ma et al. |
| 2014/0280890 | A1 | 9/2014 | Yi et al. |
| 2014/0368629 | A1 | 12/2014 | Lucet-Levannier et al. |
| 2015/0050624 | A1 | 2/2015 | Yamanashi et al. |
| 2015/0356661 | A1 | 12/2015 | Rousay |
| 2015/0366328 | A1 | 12/2015 | Tamura et al. |
| 2016/0210602 | A1 | 7/2016 | Siddique et al. |
| 2016/0357578 | A1 | 12/2016 | Kim et al. |
| 2017/0185365 | A1 | 6/2017 | Sugaya |
| 2017/0185824 | A1 | 6/2017 | Cheng et al. |
| 2017/0255478 | A1 | 9/2017 | Chou et al. |
| 2017/0340087 | A1 | 11/2017 | Samain et al. |
| 2017/0364959 | A1* | 12/2017 | Kim ................... G06Q 30/0261 |
| 2017/0369229 | A1 | 12/2017 | Samain et al. |

FOREIGN PATENT DOCUMENTS

| | | | |
|---|---|---|---|
| JP | 2004030208 | A | 1/2004 |
| JP | 2005044283 | A | 2/2005 |
| JP | 2011022733 | A | 2/2011 |
| JP | 2017027482 | A | 2/2017 |
| JP | 6174277 | B1 | 8/2017 |
| TW | I433043 | B | 4/2014 |
| WO | 2011085727 | A8 | 7/2011 |
| WO | 2017179134 | A1 | 10/2017 |

OTHER PUBLICATIONS

We create augmented reality tech for beauty brands, http://modiface.com/ (printed Jun. 14, 2018).

Get Glam with our Online Virtual Makeover, http://www.newyorkimageconsultant.com/online-makeover.html (printed Jun. 7, 2018).

Jisoo Park et al. "An Automatic Virtual Makeup Scheme Based on Personal Color Analysis" Ubiquitous Information Management and Communication, ACM, 2 Penn Plaza, Suite 701 New York NY 10121-0701 USA, Jan. 5, 2018 (Jan. 1, 2018), pp. 1-7, XP058407756.

Presley West, "Sephora's AR App Update Lets You Try Virtual Makeup on At Home—VRScout", Mar. 22, 2017 (Mar. 22, 2017), XP055568002.

European search report issued in corresponding European patent application No. 18201738.4 dated Mar. 26, 2019.

* cited by examiner

Lipstick score: 5*0.5 + 2*0.3 + 1*0.2 = 3.3
Eyeshadow score: 3*0.5 + 3*0.3 + 2*0.1 = 2.6

Suppose that the user removes the eyeshadow effect. The total score then becomes 3.3 as the eyeshadow score becomes 0.

New hesitation values after removal of eyeshadow effect:
Lipstick hesitation %: 100%
Eyeshadow hesitation %: 0%

SYSTEMS AND METHODS FOR GENERATING AND ANALYZING USER BEHAVIOR METRICS DURING MAKEUP CONSULTATION SESSIONS

CROSS-REFERENCE TO RELATED APPLICATION

This application claims priority to, and the benefit of, U.S. Provisional Patent Application entitled, "Method for analyzing user's touch rate (hesitation %) to provide beauty artist user's makeup preference," having Ser. No. 62/627,010, filed on Feb. 6, 2018, which is incorporated by reference in its entirety.

TECHNICAL FIELD

The present disclosure generally relates to makeup consultation and more particularly, to systems and methods for generating and analyzing user behavior metrics during makeup consultation sessions.

BACKGROUND

Although makeup professional commonly assist individuals with applying cosmetic products to achieve a desired look, it can be difficult at times for an individual to provide feedback on the exact combination of cosmetics that the individual prefers, particularly when there may be subtle differences between cosmetics recommend by the makeup professional. Therefore, there is a need for an improved platform for providing makeup professionals with feedback to facilitate the recommendation and virtual application of cosmetics during a makeup consultation session.

SUMMARY

In accordance with one embodiment, a server device detects initiation of a video conferencing session between a consultation device utilized by a makeup professional and a client device utilized by a user receiving a makeup consultation from the makeup professional. The server device extracts data from the client device during the video conferencing session, the data characterizing behavior of the user performed on the client device with respect to suggested cosmetic effects transmitted by the makeup professional via the consultation device to the client device. The server device applies weight values to the extracted data and generates one or more hesitation metrics based on the weight values and causes the one or more hesitation metrics to be displayed in a user interface on the consultation device.

Another embodiment is a system that comprises a memory storing instructions and a processor coupled to the memory. The processor is configured by the instructions to detect initiation of a video conferencing session between a consultation device utilized by a makeup professional and a client device utilized by a user receiving a makeup consultation from the makeup professional. The processor is further configured to extract data from the client device during the video conferencing session, the data characterizing behavior of the user performed on the client device with respect to suggested cosmetic effects transmitted by the makeup professional via the consultation device to the client device. The processor is further configured to apply weight values to the extracted data and generate one or more hesitation metrics based on the weight values and cause the one or more hesitation metrics to be displayed in a user interface on the consultation device.

Another embodiment is a non-transitory computer-readable storage medium storing instructions to be implemented by a computing device having a processor, wherein the instructions, when executed by the processor, cause the computing device to detect initiation of a video conferencing session between a consultation device utilized by a makeup professional and a client device utilized by a user receiving a makeup consultation from the makeup professional. The processor is further configured to extract data from the client device during the video conferencing session, the data characterizing behavior of the user performed on the client device with respect to suggested cosmetic effects transmitted by the makeup professional via the consultation device to the client device. The processor is further configured to apply weight values to the extracted data and generate one or more hesitation metrics based on the weight values and cause the one or more hesitation metrics to be displayed in a user interface on the consultation device.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although professional makeup professionals commonly assist individuals with applying cosmetic products to achieve a desired look, it can be difficult at times for an individual to provide feedback on the exact combination of cosmetics that the individual prefers, particularly when there may be subtle differences between cosmetics. Furthermore, at times, an individual participating in a makeup consultation session may not be entirely comfortable with providing feedback to the makeup professional. The present invention addresses shortcomings of conventional makeup consultation platforms by analyzing the user's behavior with respect to suggested cosmetic effects provided by a makeup professional during a makeup consultation session. User behavior metrics are generated and analyzed to aid the makeup professional in more efficiently suggesting cosmetic effects to the user, thereby enhancing the quality and effectiveness of the makeup consultation session.

Figure 1:
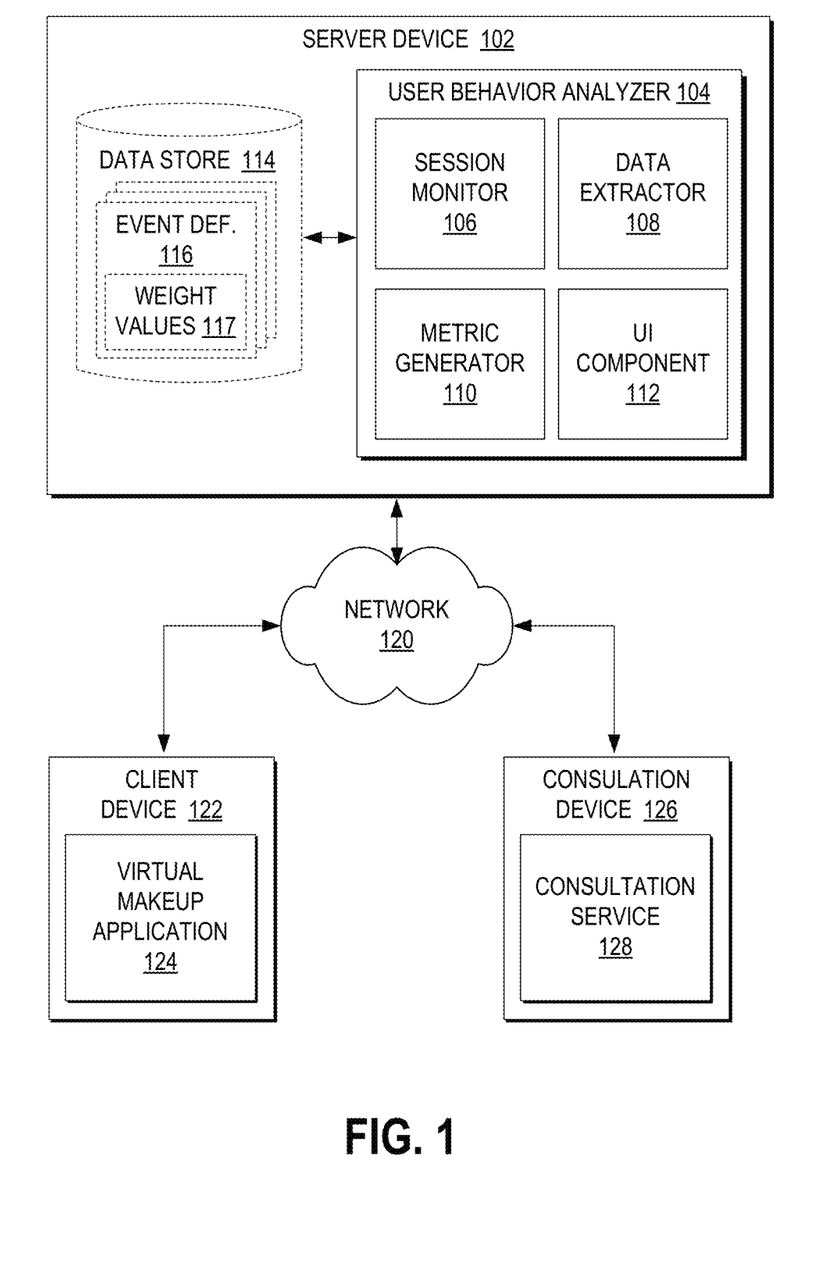
FIG. 1 is a block diagram of a networked environment for generating and analyzing user behavior metrics during makeup consultation sessions according to various embodiments of the present disclosure.

A description of a networked environment for implementing the techniques herein is now described followed by a discussion of the operation of the components within the system. FIG. 1 is a block diagram of a networked environment for generating and analyzing user behavior metrics during makeup consultation sessions. The networked environment includes a server device 102 that may comprise a server computer or any other system providing computing capability. Alternatively, the server device 102 may employ a plurality of computing devices that can be arranged, for example, in one or more server banks, computer banks or other arrangements. Such computing devices can be located in a single installation or can be distributed among different geographical locations.

A user behavior analyzer 104 executes on a processor of the server device 102 and includes a session monitor 106, a data extractor 108, a metric generator 110, and a user interface (UI) component 112. The session monitor 106 is configured to detect initiation of a video conferencing session between a client device 122 utilized by a user and a consultation device 126 utilized by a makeup professional for conducting a makeup consultation session by the makeup professional.

The data extractor 108 is configured to extract data from the client device 122 during the video conferencing session, where the extracted data characterizes behavior of the user performed on the client device 122 with respect to suggested cosmetic effects transmitted by the makeup professional via the consultation device 126. The metric generator 110 is configured to apply predetermined weight values to the extracted data and generate one or more hesitation metrics. In the context of this disclosure, hesitation metrics are metrics that generally reflect the user's preferences (or dislikes/priority) with regards to cosmetic effects suggested by a makeup professional. As described in more detail below, the weight values may correspond to various target events (or functionality of the makeup application) corresponding to user behavior on the client device.

Target events may comprise, for example, selection by the user on the client device 122 of a type of cosmetic effect, selection by the user of a variation in attribute of the selected type of cosmetic effect, and/or removal by the user of a type of cosmetic effect. Each selection may be performed using certain functionality of the application. Thus, for some embodiments, the weight values may be predetermined by the software manufacturer and varied according to functionality. Such weight values 117 may be retrieved by the metric generator 110 from a data store 114, which stores definitions of target events 116 and corresponding weight values 117. The UI component 112 causes the one or more hesitation metrics to be displayed in a user interface on the consultation device 126.

Both the cosmetic client device 122 and the consultation device 126 may be embodied as a computing device such as, but not limited to, a smartphone, a tablet computing device, a laptop, and so on. The server device 102, client device 122, and the consultation device 126 are communicatively coupled via a network 120 such as, for example, the Internet, intranets, extranets, wide area networks (WANs), local area networks (LANs), wired networks, wireless networks, or other suitable networks, etc., or any combination of two or more such networks.

A virtual makeup application 124 executes on a processor of the client device 122 and allows the user of the client device 122 to participate in makeup consultation sessions with a makeup professional via the consultation device 126. The virtual makeup application 124 is further configured to receive recommendations from the consultation device 126 with regards to cosmetic effects. The virtual makeup application 124 performs virtual application of such cosmetic effects to a facial region of a live video feed or digital image of the user of the client device 122. The consultation service 128 executing on a processor of the consultation device 126 allows the makeup professional to conduct makeup consultation sessions with the user of the client device 122 and is utilized for providing recommendations on various cosmetic effects for various facial features of the user.

Figure 2:
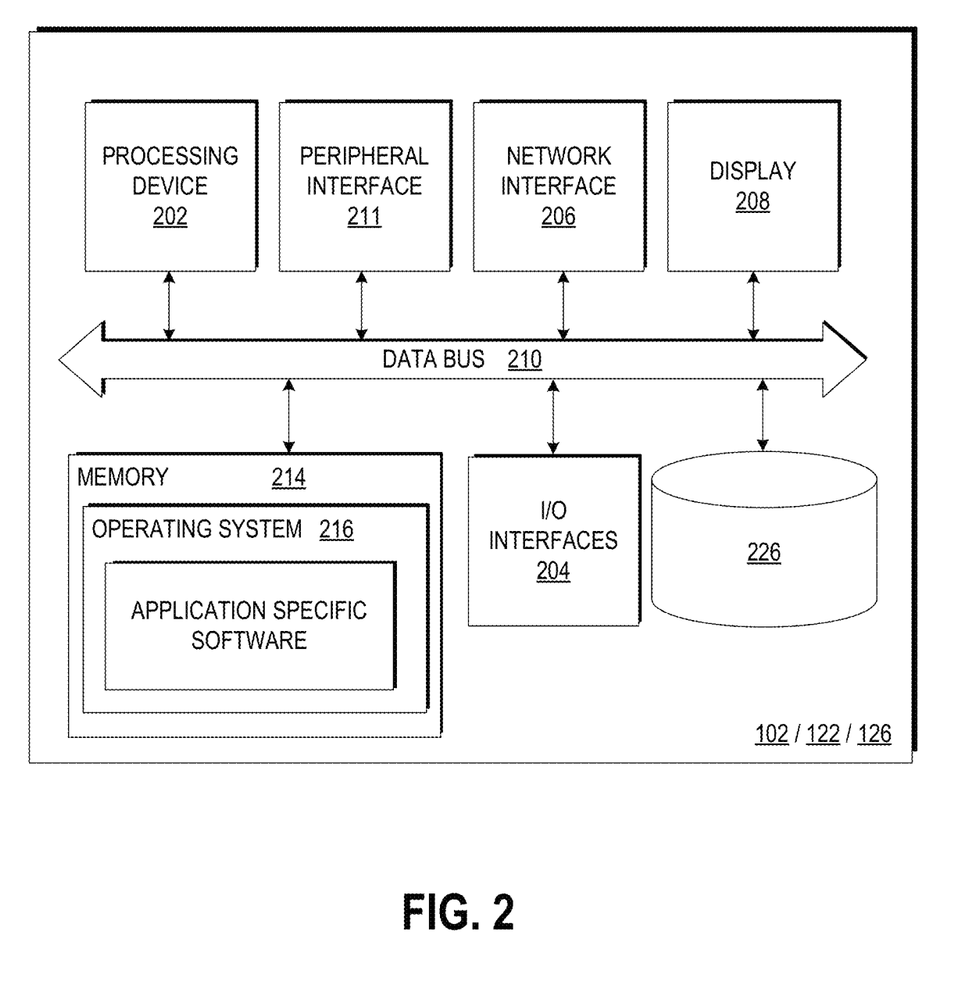
FIG. 2 is a schematic diagram of the computing devices of FIG. 1 according to various embodiments of the present disclosure.

FIG. 2 illustrates a schematic block diagram for each of the server device 102, the client device 122, and the consultation device 126 in FIG. 1. Each of these computing devices 102, 122, 126 may be embodied in any one of a wide variety of wired and/or wireless computing devices, such as a desktop computer, portable computer, dedicated server computer, multiprocessor computing device, smart phone, tablet, and so forth. As shown in FIG. 2, each of these computing devices 102, 122, 126 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing devices 102, 122, 126 depicted in FIG. 1. In accordance with such embodiments, the components are stored in memory 214 and executed by the processing device 202, thereby causing the processing device 202 to perform the operations/functions relating to the features disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
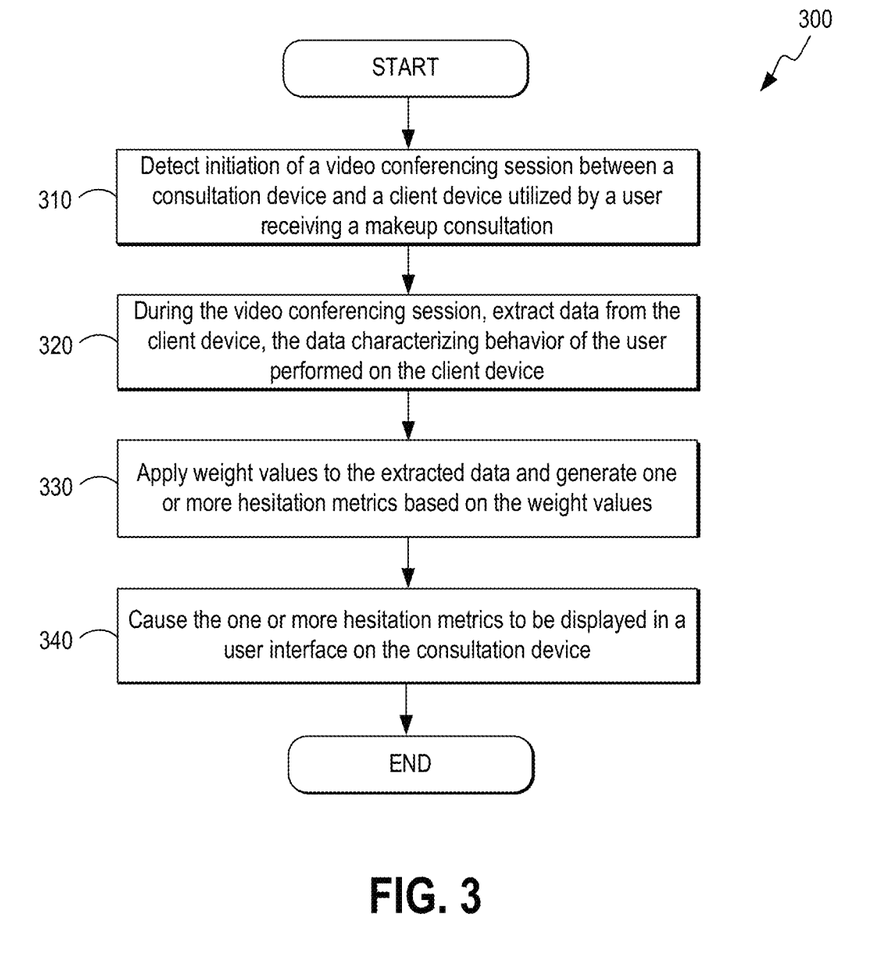
FIG. 3 is a top-level flowchart illustrating examples of functionality implemented as portions of the server device of FIG. 1 for generating and analyzing user behavior metrics during makeup consultation sessions according to various embodiments of the present disclosure.

Reference is made to FIG. 3, which is a top-level flowchart illustrating examples of functionality implemented as portions of the server device 102 of FIG. 1 for generating and analyzing user behavior metrics during makeup consultation sessions according to various embodiments of the present disclosure. It is understood that the flowchart 300 of FIG. 3 provides merely an example of the different types of functional arrangements that may be employed to implement the operation of the server device 102 depicted in FIG. 1. As an alternative, the flowchart 300 of FIG. 3 may be viewed as depicting an example of steps of a method implemented in the server device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the server device 102 detects initiation of a video conferencing session between a consultation device 126 (FIG. 1) utilized by a makeup professional and a client device 122 (FIG. 1) utilized by a user receiving a makeup consultation from the makeup professional. At block 320, the server device 102 extracts data from the client device 122 during the video conferencing session, where the data characterizes behavior of the user performed on the client device with respect to suggested cosmetic effects transmitted by the makeup professional via the consultation device 126 to the client device 122.

For some embodiments, the server device 102 extracts the data from the client device 122 by extracting data relating to a predetermined grouping of target events corresponding to user behavior on the client device 122. For some embodiments, the grouping of target events may comprise selection by the user on the client device 122 of a type of cosmetic effect, where each type of cosmetic effect corresponds to cosmetic effects for different facial features. For example, a target event may comprise the user tapping on a touchscreen of the client device 122 to select a particular cosmetic effect recommended by the makeup professional.

The grouping of target events may also comprise selection by the user on the client device 122 of a variation in attribute of the selected type of cosmetic effect. For example, a target event may comprise the user tapping on a touchscreen of the client device 122 to change the color or tone of a particular cosmetic effect (e.g., lipstick) recommended by the makeup professional. The grouping of target events may also comprise removal by the user on the client device 122 of a type of cosmetic effect. For example, a target event may comprise the user performing a gesture (e.g., swipe gesture) to remove a particular cosmetic effect recommended by the makeup professional. As another example, a target event may comprises the user enhancing or reducing a cosmetic effect using user interface tools.

At block 330, the server device 102 applies weight values 117 (FIG. 1) to the extracted data and generates one or more hesitation metrics based on the weight values. For some embodiments, the server device 102 applies the weight values to the extracted data by applying predetermined weight values for each event in the grouping of target events.

At block 340, the server device 102 causes the one or more hesitation metrics to be displayed in a user interface on the consultation device. For some embodiments, this involves the server device 102 sorting the one or more hesitation metrics and causing the sorted one or more hesitation metrics to be displayed in the user interface on the consultation device 126. Thereafter, the process in FIG. 3 ends.

Figure 4:
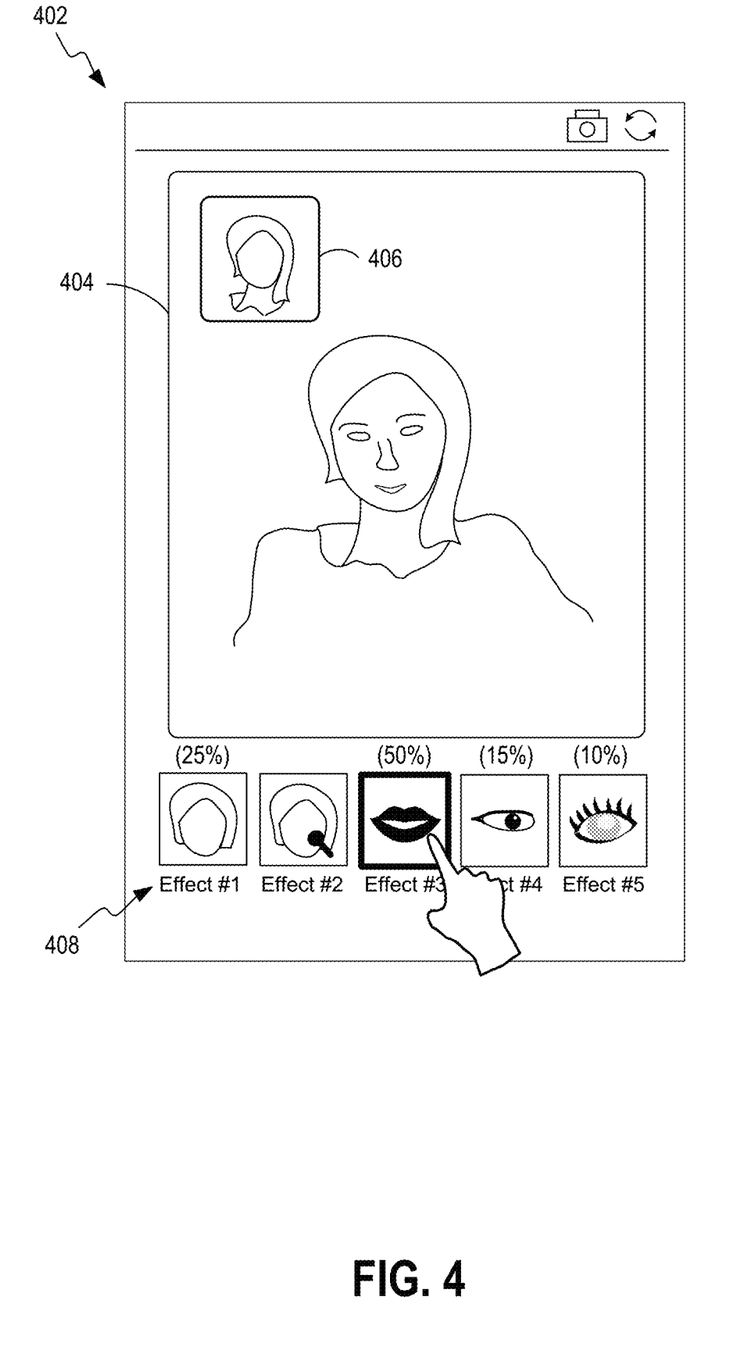
FIG. 4 illustrates an example of a user selecting a cosmetic effect in a user interface provided on a display of the client device in FIG. 1 according to various embodiments of the present disclosure.

FIG. 4 illustrates an example of a user selecting a cosmetic effect in a user interface 402 provided on a display of the client device 122 in FIG. 1 according to various embodiments of the present disclosure. As shown, the user interface 402 includes a virtual mirror window 404 that depicts a live video feed of the user's facial region. Alternatively, the virtual mirror 404 may depict a still image of the user's facial region. The user interface 402 also includes a second window 406 that depicts a live video feed of the makeup professional.

The user interface 402 also includes a plurality of graphical thumbnail representations 408 that each correspond to a particular cosmetic effect recommended by the makeup professional using a consultation device 126 (FIG. 1). In the example shown, graphical thumbnail representations for different effects (Effect #1 to Effect #5) are shown. To further illustrate, Effect #1 may correspond to a first cosmetic effect (e.g., application of foundation to the facial region), Effect #2 may correspond to a second cosmetic effect (e.g., application of blush to the facial region), Effect #3 may correspond to a third cosmetic effect (e.g., application of lipstick), Effect #4 may correspond to a fourth cosmetic effect (e.g., application of eye liner), and Effect #5 may correspond to a fifth cosmetic effect (e.g., application of makeup to eye lashes), and so on.

In the example shown, the user selects one of the cosmetic effects to try on. In accordance with some embodiments, selection of the cosmetic effect corresponds to a target event, and the data extractor 108 (FIG. 1) executing in the server device 102 obtains data relating to this event. Furthermore, this target event comprising selection of a cosmetic effect (FIG. 1). The percentages shown in FIG. 4 represent one or more hesitation metrics later provided to the makeup professional by the server device 102 to facilitate the recommendation of cosmetic effects. For example, the selection of Effect #1 corresponds to a hesitation metric of 25% with respect to all cosmetic effect selections made by the user. The selection of Effect #3 corresponds to a hesitation metric of 50% with respect to all cosmetic effect selections made by the user. The selection of Effect #4 corresponds to a hesitation metric of 15% with respect to all cosmetic effect selections made by the user. The selection of Effect #5 corresponds to a hesitation metric of 10% with respect to all cosmetic effect selections made by the user. Note that the hesitation metric is not limited to a percentage value and can comprise any kind of metric that indicates a preference level (e.g., an "A" rating versus a "C" rating, a 5-star versus 3-star rating).

Figure 5:
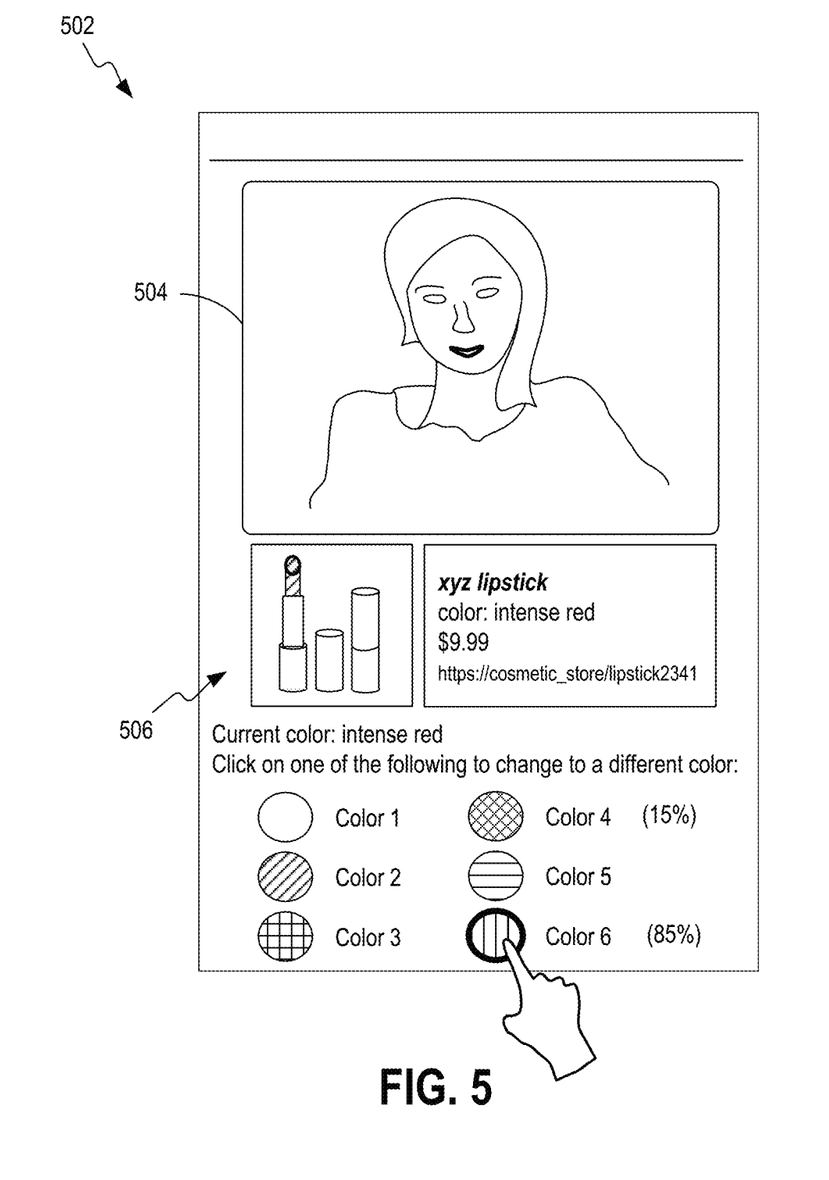
FIG. 5 illustrates an example of a user adjusting an attribute of a cosmetic effect in a user interface provided on a display of the client device in FIG. 1 according to various embodiments of the present disclosure.

FIG. 5 illustrates an example of a user adjusting an attribute of a cosmetic effect in a user interface 502 provided on a display of the client device 122 in FIG. 1 according to various embodiments of the present disclosure. As shown, the user interface 502 includes a virtual mirror window 504 that depicts a live video feed of the user's facial region. Alternatively, the virtual mirror 504 may depict a still image of the user's facial region. The user interface 502 also includes product data 506, which may comprise, for example, an image of a product corresponding to a cosmetic effect, description of the product, pricing information for a product, and so on.

The user interface 502 also includes user interface controls that allow the user to change the attribute (color) of the cosmetic effect. In accordance with some embodiments, variation of an attribute of the cosmetic effect by the user corresponds to a target event, and the data extractor 108 (FIG. 1) executing in the server device 102 obtains data relating to this event. In the example shown, the number of selections of Color 4 among all color changes made by the user is recorded, while the number of selections of Color 6 among all color changes made by the user is also recorded. (In the example shown, Color 5 has not been selected by the user.) Suppose for this example that the first target event comprises selection of colors and is assigned a predetermined weight value of 60% in the first user interface. The second target event comprises an attribute change (e.g., variation of color intensity) of a cosmetic effect and may be assigned a value. The target event comprising an attribute change is assigned a predetermined weight value of 20% in the third user interface.

Figure 6:
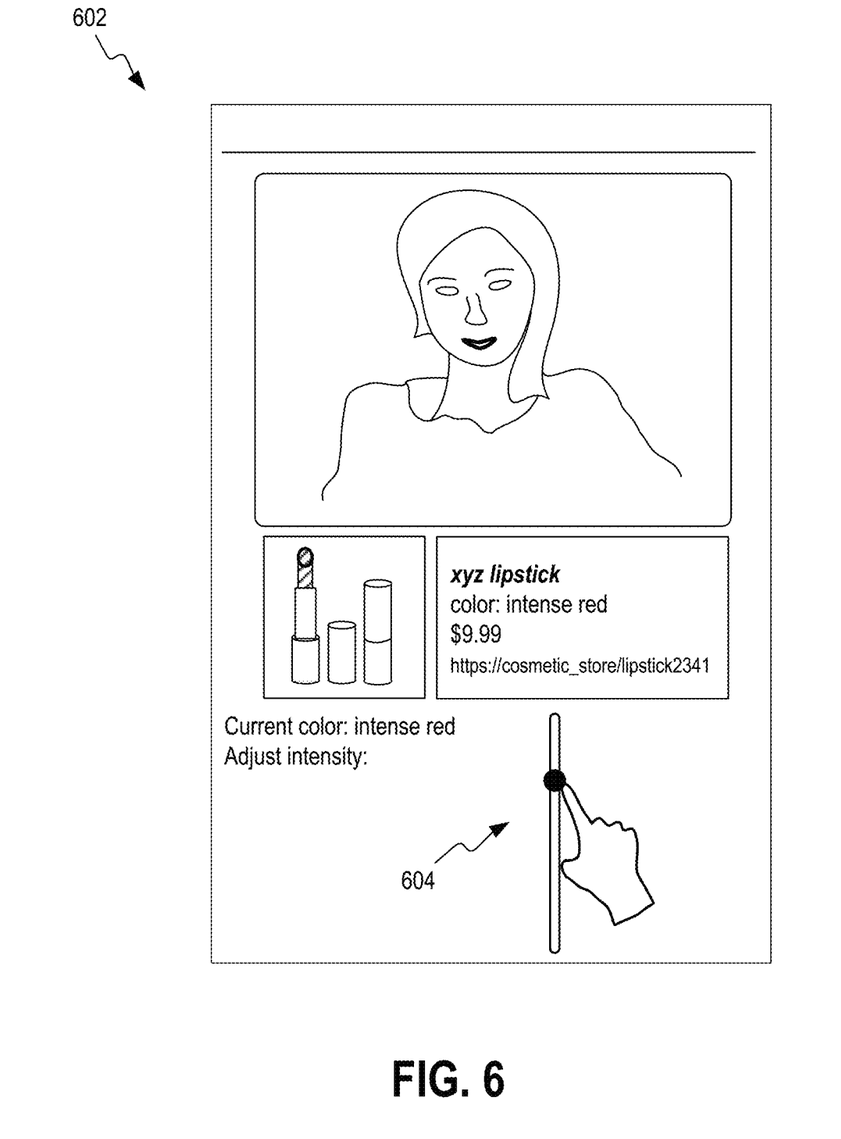
FIG. 6 illustrates an example of a user adjusting another attribute of a cosmetic effect in a user interface provided on a display of the client device in according to various embodiments of the present disclosure.
Figure 7:
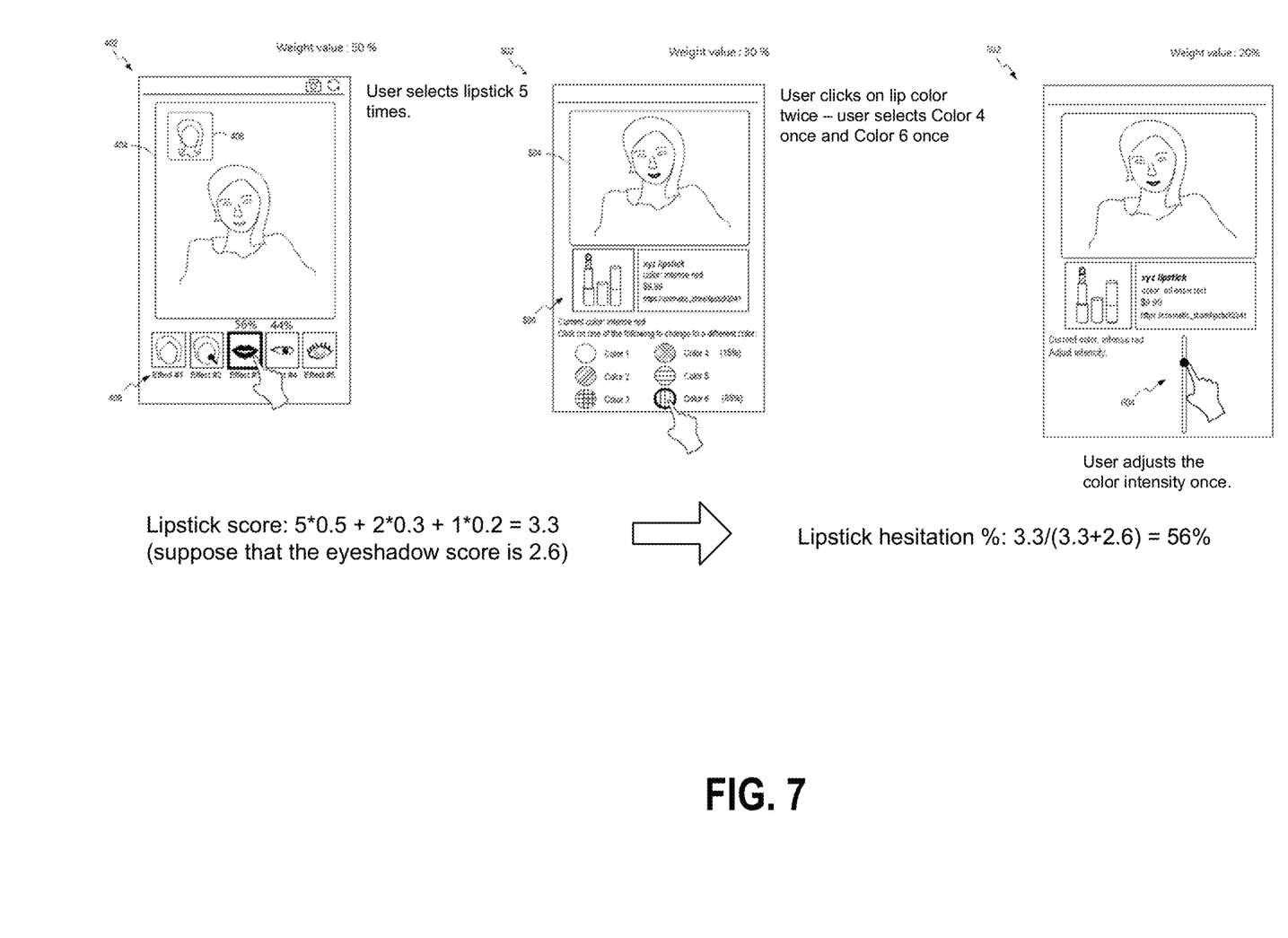
FIG. 7 illustrates calculation of the lipstick and eyeshadow hesitation metrics based on target events involving the user interfaces in FIGS. 4-6 according to various embodiments of the present disclosure.

FIG. 7 illustrates calculation of the lipstick hesitation metrics based on target events involving the user interfaces in FIGS. 4-6. The hesitation metrics can then be calculated as a function of the weight values and corresponding target events. As shown, the number of lip colors tried by the user (e.g., 2 times—Color 4 once and Color 6 once), the lip area is changed by the user 5 times, while the intensity is changed once. These target events are multiplied by their respective weight values. Assume for this example, that the eyeshadow score is 2.6. Based on this, the lipstick hesitation metric is calculated for the lipstick effect while taking use of the eyeshadow effect into consideration. The hesitation metrics may be utilized by a makeup professional in making recommendations to the user.

To further illustrate, consider the following additional example relating to an eyeshadow effect. Suppose that the user clicks on the eyeshadow effect three times using the user interface in FIG. 4 and that this target event has a predetermined weight value of 50%. Suppose that the user also clicks on a particular eyeshadow color (e.g., Color 3) three times using the user interface in FIG. 5 and that this target event has a predetermined weight value of 30%. Finally, suppose that the user adjusts the intensity of the selected eyeshadow twice using the user interface in FIG. 6 and that this target event has a predetermined weight value of 10%. Based on the occurrence of these target events, the eyeshadow score can be calculated utilizing their respective weight values. In this example, the eyeshadow score is calculated as follows: eyeshadow score 3*0.5+3*0.3+2*0.1=2.6. Referring back to the example in FIG. 7, target events occur relating to both the lipstick and eyeshadow effects are then considered. In this example, the hesitation metrics provide an indication to the makeup professional of which product between the two that the user is more interested in. As shown in FIG. 7, the hesitation metric for lipstick is 56% whereas the hesitation metric for eyeshadow is 44%. Based on these metrics, the makeup professional can infer that the user has more interest in lipstick than eyeshadow. The hesitation metrics may be utilized by a makeup professional in making recommendations to the user.

Figure 8:
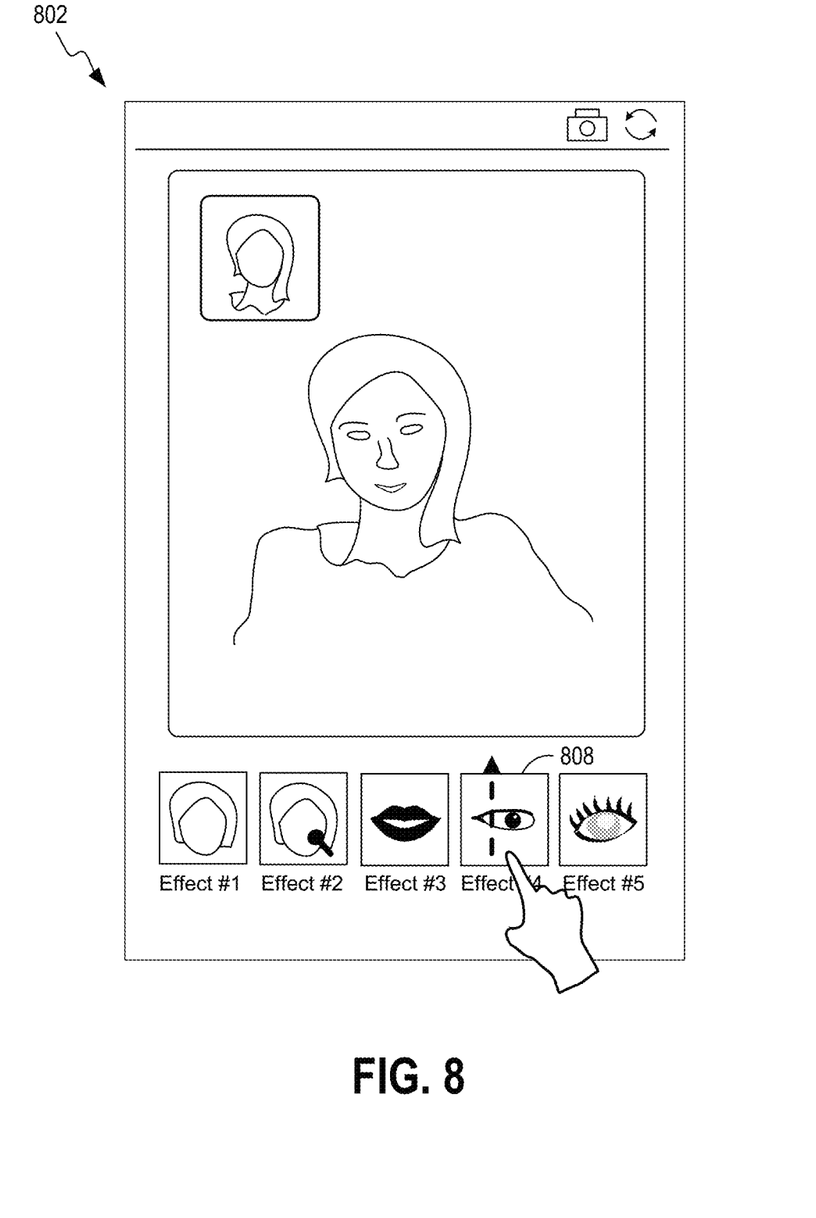
FIG. 8 illustrates an example of a user removing a cosmetic effect in a user interface provided on a display of the client device in FIG. 1 according to various embodiments of the present disclosure.

FIG. 8 illustrates an example of a user removing a cosmetic effect in a user interface 802 provided on a display of the client device 122 in FIG. 1 according to various embodiments of the present disclosure. In the example shown, the user removes a cosmetic effect 608 recommended by the makeup professional. In accordance with some embodiments, removal of the cosmetic effect 808 by the user corresponds to a target event, and the data extractor 108 (FIG. 1) executing in the server device 102 obtains data relating to this event. Furthermore, this target event comprising removal of a cosmetic effect may be assigned a value corresponding to a weight value 117 (FIG. 1). This value may then be used for generating one or more hesitation metrics later provided to the makeup professional by the server device 102 to facilitate the recommendation of cosmetic effects.

Figure 9:
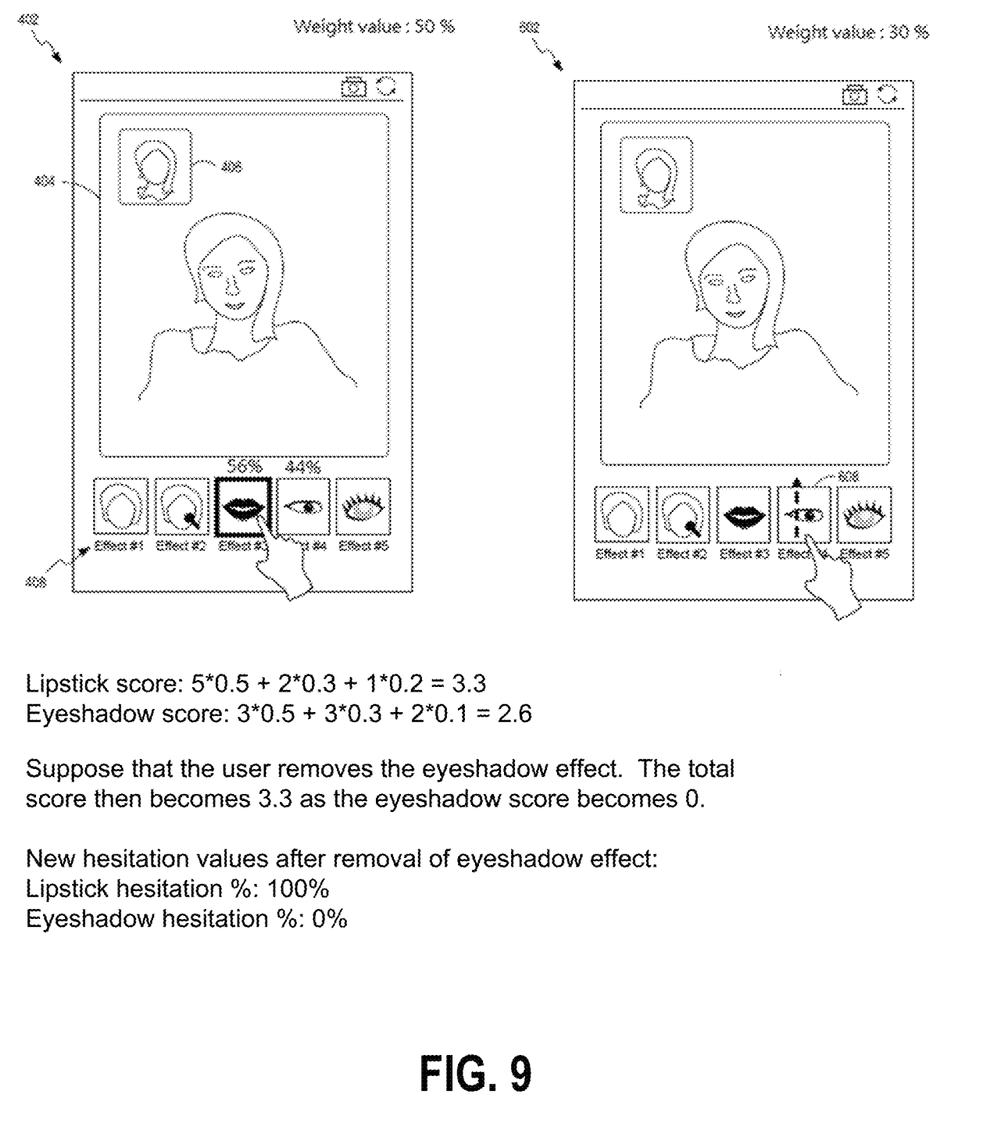
FIG. 9 illustrates calculation of the lipstick and eyeshadow hesitation metrics based on target events involving the user interfaces in FIGS. 4 and 8 according to various embodiments of the present disclosure.

FIG. 9 illustrates calculation of the lipstick and eyeshadow hesitation metrics based on target events involving the user interfaces in FIGS. 4 and 8 according to various embodiments of the present disclosure. As shown, the hesitation metrics change due to removal of the eyeshadow effect. When the eyeshadow effect is removed (for example, by a gesture performed by the user), the total score becomes 3.3. The hesitation metric of the eyeshadow effect becomes 0%, and the hesitation metric of the lipstick effect becomes 100%. Based on these hesitation metrics, the makeup professional can decide to avoid recommending an eyeshadow effect to the user in the future.

Figure 10:
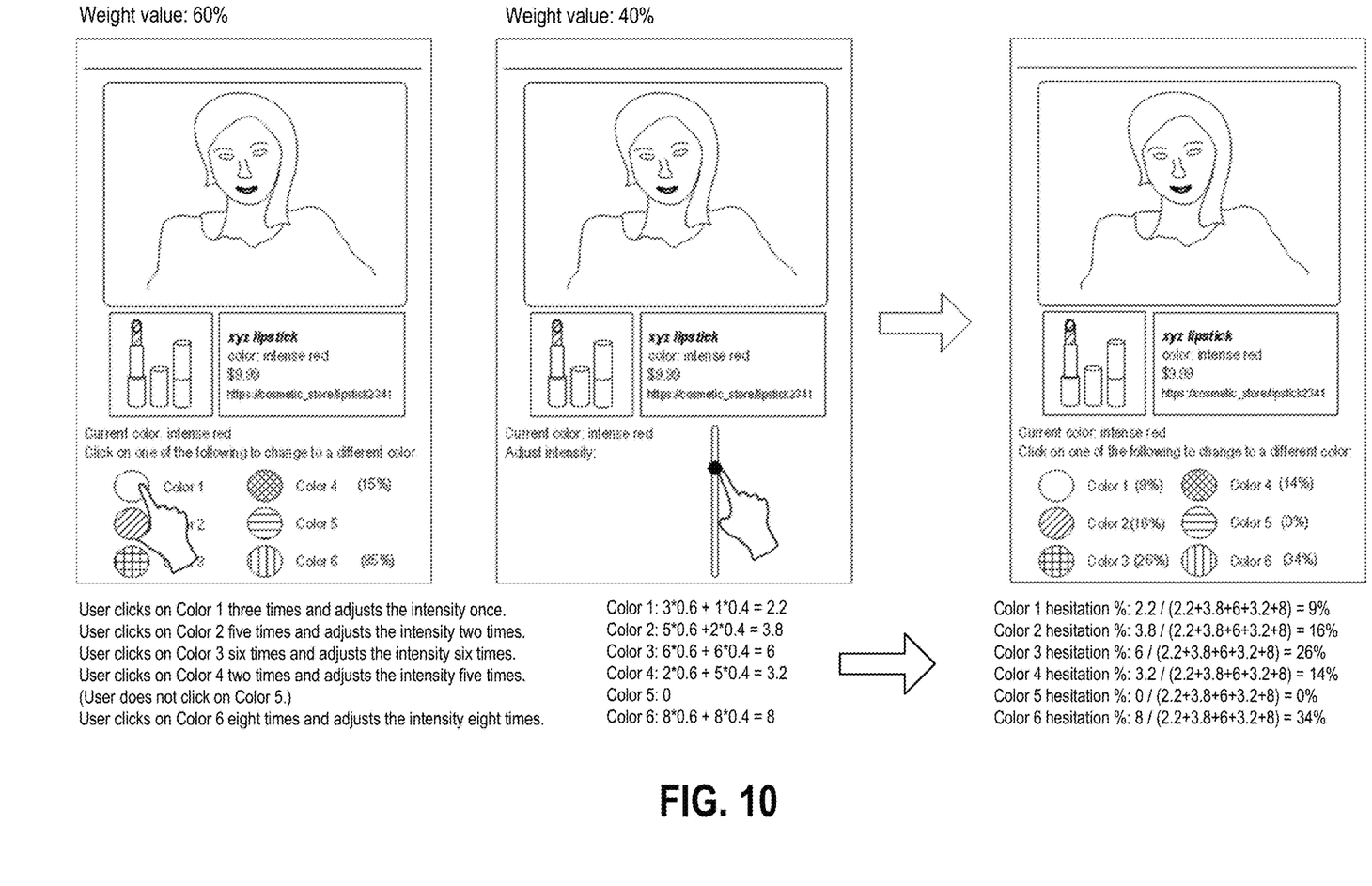
FIG. 10 illustrates another example calculation of hesitation metrics relating to the color based on target events involving user interfaces in FIGS. 5 and 6 according to various embodiments of the present disclosure.

FIG. 10 illustrates another example calculation of hesitation metrics relating to the color based on target events involving user interfaces in FIGS. 5 and 6 according to various embodiments of the present disclosure. In the example shown, the respective number of selections of each color (Colors 1-6) made by the user is recorded. (In the example shown, Color 5 has not been selected by the user.) Suppose for this example that the first target event comprises the selection of specific colors and is assigned a predetermined weight value of 60% in the first user interface. The second target event comprises an attribute change (e.g., variation of color intensity) of a cosmetic effect and is assigned a predetermined weight value of 40%.

As shown in FIG. 10, the hesitation metrics are calculated for each color based on the number of times the user selects each color, the number of times the user adjusts the intensity of each color, and the respective weight values assigned to each target event. The hesitation metrics may then be utilized by the makeup professional to facilitate the recommendation of cosmetic products to the user. Based on the fact that Color 6 has the highest hesitation percentage in the example shown in FIG. 10, the makeup professional can use this information to suggest cosmetic products (e.g., lipstick) of this particular color. Similarly, based on the fact that Color 5 has the lowest hesitation percentage in this example, the makeup professional can use this information to avoid suggesting cosmetic products of this particular color.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a server device, comprising:
    detecting initiation of a video conferencing session between a consultation device utilized by a makeup professional and a client device utilized by a user receiving a makeup consultation from the makeup professional;
    extracting data from the client device during the video conferencing session, the data characterizing behavior of the user performed on the client device with respect to suggested cosmetic effects transmitted by the makeup professional via the consultation device to the client device;
    applying weight values to the extracted data;
    generating one or more hesitation metrics based on the weight values; and
    causing the one or more hesitation metrics to be displayed in a user interface on the consultation device.

2. The method of claim 1, wherein extracting the data from the client device comprises extracting data relating to a predetermined grouping of target events corresponding to user behavior on the client device.

3. The method of claim 2, wherein applying the weight values to the extracted data comprises applying predetermined weight values for each event in the grouping of target events.

4. The method of claim 3, wherein the grouping of target events comprises at least one of:
    selection by the user on the client device of a type of cosmetic effect;
    selection by the user on the client device of a variation in attribute of the selected type of cosmetic effect; and
    removal by the user on the client device of a type of cosmetic effect.

5. The method of claim 4, wherein each type of cosmetic effect corresponds to cosmetic effects for different facial features.

6. The method of claim 4, wherein the variation in the attribute of the selected type of cosmetic effect comprises a color variation of the type of cosmetic effect.

7. The method of claim 4, wherein the variation in the attribute of the selected type of cosmetic effect comprises enhancement or reduction of a cosmetic effect.

8. The method of claim 1, wherein causing the one or more hesitation metrics to be displayed in the user interface on the consultation device comprises:
    sorting the one or more hesitation metrics; and
    causing the sorted one or more hesitation metrics to be displayed in the user interface on the consultation device.

9. A system, comprising:
    a memory storing instructions;
    a processor coupled to the memory and configured by the instructions to at least:
        detect initiation of a video conferencing session between a consultation device utilized by a makeup professional and a client device utilized by a user receiving a makeup consultation from the makeup professional;
        extract data from the client device during the video conferencing session, the data characterizing behavior of the user performed on the client device with respect to suggested cosmetic effects transmitted by the makeup professional via the consultation device to the client device;
        apply weight values to the extracted data and generate one or more hesitation metrics based on the weight values; and
        cause the one or more hesitation metrics to be displayed in a user interface on the consultation device.

10. The system of claim 9, wherein the processor extracts the data from the client device by extracting data relating to a predetermined grouping of target events corresponding to user behavior on the client device.

11. The system of claim 10, wherein the processor applies the weight values to the extracted data by applying predetermined weight values for each event in the grouping of target events.

12. The system of claim 11, wherein the grouping of target events comprises at least one of:
    selection by the user on the client device of a type of cosmetic effect;
    selection by the user on the client device of a variation in attribute of the selected type of cosmetic effect; and
    removal by the user on the client device of a type of cosmetic effect.

13. The system of claim 12, wherein each type of cosmetic effect corresponds to cosmetic effects for different facial features.

14. The system of claim 12, wherein the variation in the attribute of the selected type of cosmetic effect comprises a color variation of the type of cosmetic effect.

15. The system of claim 9, wherein the processor causes the one or more hesitation metrics to be displayed in the user interface on the consultation device by:
    sorting the one or more hesitation metrics; and
    causing the sorted one or more hesitation metrics to be displayed in the user interface on the consultation device.

16. A non-transitory computer-readable storage medium storing instructions to be implemented by a computing device having a processor, wherein the instructions, when executed by the processor, cause the computing device to at least:
    detect initiation of a video conferencing session between a consultation device utilized by a makeup professional and a client device utilized by a user receiving a makeup consultation from the makeup professional;
    extract data from the client device during the video conferencing session, the data characterizing behavior of the user performed on the client device with respect to suggested cosmetic effects transmitted by the makeup professional via the consultation device to the client device;

apply weight values to the extracted data and generate one or more hesitation metrics based on the weight values; and cause the one or more hesitation metrics to be displayed in a user interface on the consultation device.

17. The non-transitory computer-readable storage medium of claim 16, wherein the processor extracts the data from the client device by extracting data relating to a predetermined grouping of target events corresponding to user behavior on the client device.

18. The non-transitory computer-readable storage medium of claim 17, wherein the processor applies the weight values to the extracted data by applying predetermined weight values for each event in the grouping of target events.

19. The non-transitory computer-readable storage medium of claim 18, wherein the grouping of target events comprises at least one of:

selection by the user on the client device of a type of cosmetic effect;

selection by the user on the client device of a variation in attribute of the selected type of cosmetic effect; and removal by the user on the client device of a type of cosmetic effect.

20. The non-transitory computer-readable storage medium of claim 19, wherein each type of cosmetic effect corresponds to cosmetic effects for different facial features.

21. The non-transitory computer-readable storage medium of claim 19, wherein the variation in the attribute of the selected type of cosmetic effect comprises a color variation of the type of cosmetic effect.

* * * * *